US009234463B2

(12) United States Patent
Benjamin et al.

(10) Patent No.: US 9,234,463 B2
(45) Date of Patent: Jan. 12, 2016

(54) THERMAL MANAGEMENT SYSTEM FOR A GAS TURBINE ENGINE

(75) Inventors: Daniel Benjamin, Simsbury, CT (US);
Daniel Carminati, Berlin, CT (US);
David S. Jang, Sammamish, WA (US);
Stephan Proestler, Inning a. Ammersee (DE)

(73) Assignees: United Technologies Corporation, Hartford, CT (US); MTU Aero Engines AG, Munich (DE)

( * ) Notice: Subject to any disclaimer, the term of this patent is extended or adjusted under 35 U.S.C. 154(b) by 772 days.

(21) Appl. No.: 13/454,304

(22) Filed: Apr. 24, 2012

(65) Prior Publication Data

US 2013/0280028 A1   Oct. 24, 2013

(51) Int. Cl.
*F01D 5/08* (2006.01)
*F02C 7/12* (2006.01)
*F02C 7/18* (2006.01)
*F04D 29/32* (2006.01)

(52) U.S. Cl.
CPC . *F02C 7/12* (2013.01); *F01D 5/082* (2013.01); *F02C 7/18* (2013.01); *F04D 29/321* (2013.01)

(58) Field of Classification Search
CPC ........... F01D 5/08; F01D 5/081; F01D 5/082; F01D 5/084; F01D 5/085; F01D 5/087; F01D 5/088; F04D 5/082; F02C 7/12; F02C 7/18
See application file for complete search history.

(56) References Cited

U.S. PATENT DOCUMENTS

| 4,127,988 | A | * | 12/1978 | Becker | 60/726 |
|---|---|---|---|---|---|
| 5,317,877 | A | | 6/1994 | Stuart | |
| 5,327,719 | A | * | 7/1994 | Mazeaud et al. | 60/785 |
| 5,472,313 | A | | 12/1995 | Quinones et al. | |
| 5,555,721 | A | | 9/1996 | Bourneuf et al. | |
| 6,134,880 | A | | 10/2000 | Yoshinaka | |
| 6,267,553 | B1 | | 7/2001 | Burge | |
| 6,361,277 | B1 | | 3/2002 | Bulman et al. | |
| 6,390,771 | B1 | * | 5/2002 | Gervais et al. | 415/139 |
| 6,910,852 | B2 | | 6/2005 | Simeone et al. | |
| 7,159,402 | B2 | | 1/2007 | Hein et al. | |
| 7,448,221 | B2 | * | 11/2008 | Suciu et al. | 60/805 |
| 7,870,742 | B2 | * | 1/2011 | Lee | F01D 5/082 D5/82 |
| 2002/0108376 | A1 | | 8/2002 | Stevens | |
| 2006/0042266 | A1 | | 3/2006 | Albers et al. | |
| 2011/0129332 | A1 | * | 6/2011 | Behaghel et al. | 415/68 |
| 2011/0146298 | A1 | | 6/2011 | Reinhardt et al. | |

FOREIGN PATENT DOCUMENTS

| EP | 1820936 A2 | 8/2007 |
|---|---|---|
| FR | 2892148 A1 * | 4/2007 |

OTHER PUBLICATIONS

FR 2892148 A1 Machine Translation. Accessed EPO website Jan. 20, 2015.*
International Preliminary Report on Patentability issued Oct. 28, 2014.

* cited by examiner

*Primary Examiner* — Richard Edgar
(74) *Attorney, Agent, or Firm* — Bachman & LaPointe, P.C.

(57) ABSTRACT

A thermal management system for a gas turbine engine includes a high pressure compressor rotor having a plurality of disks and a shaft; at least one forward cavity between a rim of at least one of the disks and the shaft and at least one aft cavity formed between a rim of at least one other of the disks and the shaft; a first flow of cooling air in the at least one forward cavity; and a second flow of cooling air in the at least one aft cavity.

19 Claims, 2 Drawing Sheets

THERMAL MANAGEMENT SYSTEM FOR A GAS TURBINE ENGINE

BACKGROUND

The present disclosure relates to a thermal management system used in a gas turbine engine, in particular in a compressor section of the engine.

Gas turbine engines, such as that shown in FIG. 1, may include a low pressure compressor section 1 including a fan blade 2, a high pressure compressor section 3, a combustion section 4, a high pressure turbine section 5, and a low pressure turbine section 6. The high pressure compressor section 3 is connected to the high pressure turbine section by a hollow outer shaft 7 known as a tie shaft. The low pressure compressor section 1 is connected to the low pressure turbine section 6 by a second shaft 8, known as the low pressure shaft, which extends within the tie shaft 7.

A gas turbine engine may have a high pressure compressor rotor drum cavity in the high pressure compressor section 3 which includes a single conditioning bore flow. Sometimes, the conditioning bore flow may be insufficient in pressure to be used for cooling of the high pressure turbine blades or may have a reduced effectiveness for disk heat transfer conditioning. Furthermore, the tie shaft 7 faces the additional requirement of maintaining a favorable preload through temperature control.

SUMMARY

These factors drive the need for a multifunction airflow scheme that bridges multiple thermal zones, cavities, and compressor/turbine rotors. Thus, engine designers face a technical challenge of providing high pressure turbine blade cooling, rotor disk conditioning, and tie shaft temperature control from the high pressure compressor air system without the addition of major rotating air-system hardware.

In accordance with the present disclosure, there is provided a thermal management system for a gas turbine engine which broadly comprises means for delivering a first stream of cooling air to at least one forward cavity for controlling disk temperature and shaft temperature; and means for delivering a second stream of cooling air to at least one aft cavity for providing disk web cooling.

In another and alternative embodiment, the thermal management system further comprises means for allowing said first stream of cooling air to exit said at least one forward cavity.

In another and alternative embodiment, the thermal management system further comprises means for mixing said first stream of cooling air exiting said at least one forward cavity with an intershaft flow of cooling air.

In another and alternative embodiment, the said means for delivering a second stream of cooling air comprises means for bleeding air from a main gas path.

In another and alternative embodiment, the means for bleeding air from said main gas path comprises at least one radial bleed slot located in a rim of a disk.

In another and alternative embodiment, the main gas path is created between a casing surround a high pressure rotor and a rim of at least one disk.

In another and alternative embodiment, the means for delivering a second stream of cooling air comprises means for minimizing pressure loss while maximizing said disk web cooling.

In another and alternative embodiment, the means for minimizing pressure loss comprises at least one anti-vortex tube.

In another and alternative embodiment, the at least one anti-vortex tube is connected to a wall of a disk.

In another and alternative embodiment, the at least one anti-vortex tube includes a first anti-vortex tube mounted to a wall of a first disk and a second anti-vortex tube mounted to a wall of a second disk.

In another and alternative embodiment, a first one of said first and second anti-vortex tubes is shorter than a second one of said first and second anti-vortex tubes.

In another and alternative embodiment, the thermal management system further comprises means for isolating the at least one forward cavity from said at least one aft cavity.

In another and alternative embodiment, the isolating means comprises a seal.

In another and alternative embodiment, the thermal management system further comprises means for exiting said cooling air from said at least one aft cavity.

In another and alternative embodiment, the exiting means comprises at least one hole in a rear hub foot.

In another and alternative embodiment, the thermal management system further comprises a coupling nut with a profile sufficient to preclude obstruction of flow lines.

In another and alternative embodiment, the thermal management system further comprises means for cooling the first stream of cooling air.

In another and alternative embodiment, the cooling means comprises a heat exchanger.

In another and alternative embodiment, the thermal management system further comprises a compressor rotor having a front hub and said front hub having at least one flow hole therein for delivering said first stream of cooling air to said at least one forward cavity.

In another and alternative embodiment, the thermal management system further comprises a tie shaft and said first stream of cooling air flowing through at least one bore in at least one disk and exiting through at least one flow hole in an outer diameter of said tie shaft.

In another and alternative embodiment, the tie shaft is a hollow shaft which encases a second shaft and wherein intershaft cooling air flows between an inner diameter of said tie shaft and an outer diameter of said second shaft.

In another and alternative embodiment, the second shaft is a low pressure shaft.

In another and alternative embodiment, a portion of said first stream of cooling air mixes with a portion of said second stream of cooling air and flows through a space between said tie shaft and said second shaft.

In another and alternative embodiment, the at least one forward cavity comprises a plurality of forward cavities formed by a plurality of disks, hubs and an outer diameter of a shaft and the at least one aft cavity comprises a plurality of aft cavities formed by a plurality of disks and the outer diameter of said shaft.

Further, in accordance with the present disclosure, a process for thermally managing a gas turbine engine broadly comprises the steps of: providing a compressor rotor having a plurality of disks and a first shaft, which engine section has at least one forward cavity formed between a rim of at least one of said disks and said first shaft and at least one aft cavity formed between a rim of at least one other of said disks and said first shaft; creating a first flow of cooling air in said at least one forward cavity; and creating a second flow of cooling air in said at least one aft cavity.

In another and alternative embodiment, the second flow creating step comprises bleeding air from a gas path between a casing surrounding said compressor rotor and said rims of said disks.

In another and alternative embodiment, the second flow creating step comprises passing said bleed air through at least one anti-vortex tube.

In another and alternative embodiment, the process further comprises passing a first portion of said second flow of cooling air through at least one flow hole in a rear hub foot and allowing said first portion of said second flow of cooling air to flow to another section of said engine.

In another and alternative embodiment, the process further comprises mixing a second portion of said second flow of cooling air with said first flow of cooling air.

In another and alternative embodiment, the first flow creating step comprises causing cooling air to flow through at least one flow hole in a front hub, whereby said cooling air enters said at least one forward cavity.

In another and alternative embodiment, the process further comprises passing said cooling air forming said first flow through a heat exchanger prior to causing said cooling air forming said first flow to flow through said at least one flow hole.

In another and alternative embodiment, the process further comprises a second shaft located in an interior of said first shaft and causing said first flow of cooling air to flow between an inner diameter of said first shaft and an outer diameter of said second shaft.

Other details of the thermal management system for a gas turbine engine are described in the following detailed description and the accompanying drawings wherein like reference numerals depict like elements.

DETAILED DESCRIPTION

Figure 1:
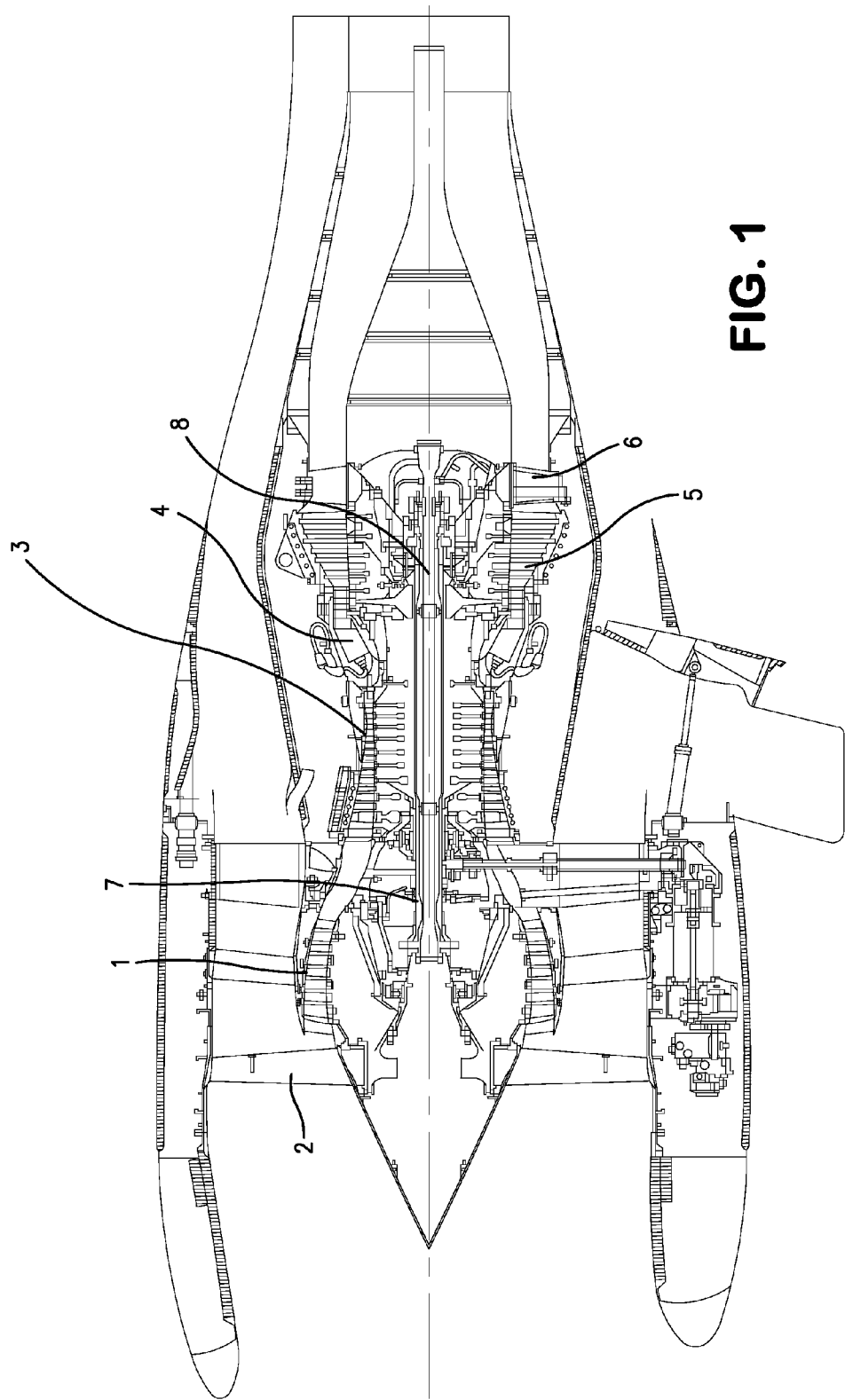
FIG. 1 is a schematic representation of a prior art gas turbine engine.
Figure 2:
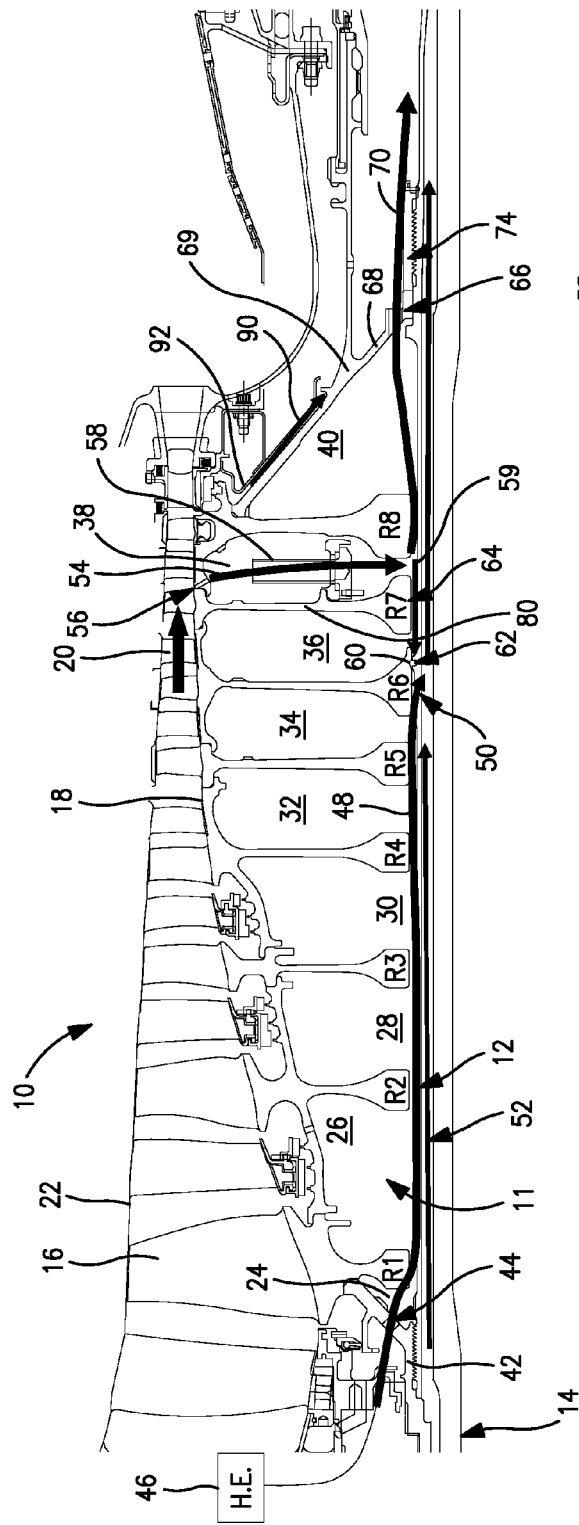
FIG. 2 is a sectional view of a thermal management system for a section of a gas turbine engine.

Referring now to FIG. 2, there is shown a compressor section 10 of a turbine engine, such as a high pressure compressor section, which includes the thermal management system of the present disclosure. The compressor section 10 includes a hollow shaft 12, known as a tie shaft, which connects the compressor rotor 11 to a turbine rotor (not shown). In the case of the section 10 being a high pressure compressor section, the tie shaft 12 connects the high pressure rotor 11 to the high pressure turbine rotor. In such a case, located within the interior of the shaft 12 is a low pressure shaft 14 which connects a low pressure compressor rotor (not shown) to a low pressure turbine rotor (not shown) of the engine.

The compressor rotor 11 has a plurality of disks R1-R8 connected to the tie shaft 12. Each respective disk may carry one or more rotor blades 16. Each of the disks R1-R8 has a rim 18. A main gas flow path 20 is formed between the rims 18 of the disks and a casing 22 which surrounds the compressor rotor 11. A plurality of bore cavities are located between the disk rims 18 and the outer diameter of the tie shaft 12. The bore cavities include forward cavities 24, 26, 28, 30, 32, and 34 and aft cavities 36, 38, and 40.

A front hub 42 is mounted to the tie shaft 12. One or more flow holes 44 are provided in the front hub 42. A supply of cooling air is delivered to the rotor cavities 24, 26, 28, 30, 32, and 34 via the flow holes 44. Prior to being delivered to the flow holes 44, the air may be cooled using a heat exchanger 46. The cooling air passing through the flow holes 44 conditions the disk temperature and transient response as well as controls the tie shaft temperature. After passing through the forward cavities, the flow 48 of cooling air exits through one or more radial holes 50 in the tie shaft 12. When a low pressure shaft is present, the flow 48 of cooling air flowing through the holes 50, as shown in FIG. 2, may mix with an intershaft flow 52 of cooling air between the tie shaft 12 and the low shaft 14. The intershaft flow 52 may be created in any suitable manner.

The aft cavities 36, 38, and 40 are conditioned and may be secondarily cooled by bleeding air from the main gas path 20 via one or more radial bleed slots 56 located in a disk rim 18. The flow 54 of bleed air may be brought down to the rotor inner diameter using anti-vortex tubes 58 to minimize pressure loss while maximizing disk web conditioning. The air cavities 36, 38, and 40 are isolated from the forward cavity air by a piston ring seal 60 between the aft side of the R6 disk bore 62 and the outer diameter wall of the tie shaft 12. The aft cavity flow of cooling air is typically hotter and at higher pressure than the forward cavity cooling air. As shown in FIG. 2, some leakage 59 of hotter aft cavity cooling air may occur under the R6 disk through the piston ring. The leakage 59 may join or mix with the colder forward cavity bore flow 48 prior to exiting the forward cavities through the holes 50 in the tie shaft 12. The majority of the flow 54 of cooling air moves aft under disk R8 and exits through an array of axial holes 66 in the foot 68 of the rear hub 69, mounted to the tie shaft 12, to form a flow 70 which flows on to a high pressure turbine (HPT) (not shown). The aft cavity flow 54 conditions the rotors R7 and R8 and also serves as turbine conditioning and blade cooling air. Radial gaps between the bores of rotors R1 to R8 and the tie shaft 12 may be held tight throughout all stages to enhance the heat transfer of the passing flow jet while operating sufficiently large to minimize pressure losses.

Intershaft air flow 52 between the tie shaft 12 and the low shaft 14 may be sourced from the same cooler supply as the forward cavity air flow 48. The intershaft air flow 52 cools the tie shaft 12 and mixes with the forward cavity bore flow 48 coming through the holes 50 in the tie shaft 12. The mixed flow may then travel aft to the low pressure turbine (LPT) section of the engine for cooling purposes.

Rear hub flow 90 may be channeled closely along the rotor surface by a static flow guide. The gap may be held to a minimum allowable to avoid clashing. This allows the momentum of air flow to counter the effects of disk pumping and provide a more uniform flow thereby minimizing losses and potential sources of heat generation.

The outer diameter of the tie shaft 12 may be designed to favor near-straight-line forward and aft bore flows and to keep the flow at a lowest possible radius. The tie shaft 12 may feature thin wall barrels with wall thickness-to-radius ratios sized to prevent ovalization flutter under the air flows washing both the outer diameter and inner diameter at different velocities and axial/circumferential directions (same flow and counter flow)/clockwise and counterclockwise). The coupling nut 74 may be designed to have a low profile to preclude obstruction of the flow lines.

Segregation of the forward and aft bore flows 48, 54, and 59 with an interseal 60 along with intershaft flow 52 allows optimization of the temperature and pressure of the flows to meet local high pressure compressor disk conditioning, overall tie shaft thermal expansion control, and turbine cooling requirements. This is achieved using existing rotor disk and shaft hardware to define flow/thermal zones avoiding additional disk components for the sole purpose of zone boundaries. The segregated aft cavities 36, 38, and 40 operate at a high pressure which provides driving force for high pressure turbine blade cooling and margin requirements. The radial bleed slots 56 and anti-vortex tubes 58 maximize the recoverable pressure from the source. Each anti-vortex tube 58 may be positioned radially to allow free vortexing of the flow near the bore and upper web 80 of the R7 and R8 disks to provide high heat transfer rapid thermal response, thereby reducing stress inducing gradients. The higher temperatures of the aft cavities flow source 54 and 59 are beneficial to the rear high pressure compressor disks R6-R8 which require higher temperatures for proper conditioning. The cooled flow of the forward cavities 24, 26, 28, 30, 32, and 34 and the flow's direction forward-to-aft helps to match the rim temperature progression fore-to-aft as it picks up heat. This, along with the intershaft flow 52 with high heat transfer from counter-rotating walls, helps to maintain the lowest possible tie shaft temperature. This is significant in maintaining elevated preload levels in the rotor stack. The contoured flow guide 92 minimizes heat generation and rear hub temperature.

Figure 3:
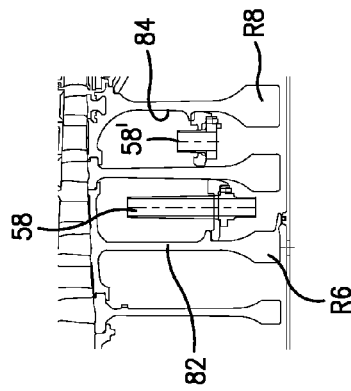
FIG. 3 is a sectional view showing an alternative arrangement for anti-vortex tubes used in the thermal management system of FIG. 2.

Referring now to FIG. 3, there is shown an alternative arrangement for the anti-vortex tubes 58. If desired, one anti-vortex tube 58 may be attached to the rear wall 82 of the R6 disk and a second anti-vortex tube 58' may be mounted to the front wall 84 of the R8 rotor. If desired, the tube 58' may be shorter than the tube 58.

While the compressor section 10 has been shown as having 8 disks, the section 10 could have more or less disks.

There has been provided a thermal management system for a gas turbine engine. While the thermal management system has been discussed in the context of specific embodiments thereof, other unforeseeable alternatives, variations, and modifications may become apparent to those skilled in the art. Accordingly, it is intended to embrace those alternatives, modifications, and variations which fall within the broad scope of the appended claims.

What is claimed is:

1. A thermal management system for a gas turbine engine comprising:
   means for delivering a first stream of cooling air to at least one forward cavity for controlling disk temperature and shaft temperature;
   means for allowing said first stream of cooling air to exit said at least one forward cavity;
   means for delivering a second stream of cooling air to at least one aft cavity for providing disk web cooling; and
   means for mixing said first stream of cooling air exiting said at least one forward cavity with an intershaft flow of cooling air, wherein said at least one forward cavity comprises a plurality of forward cavities formed by a plurality of disks, hubs and an outer diameter of a shaft and said at least one aft cavity comprises a plurality of aft cavities formed by a plurality of disks and the outer diameter of said shaft.

2. The thermal management system of claim 1, wherein said means for delivering a second stream of cooling air comprises means for bleeding air from a main gas path.

3. The thermal management system of claim 2, wherein said means for bleeding air from said main gas path comprises at least one radial bleed slot located in a rim of a disk.

4. The thermal management system of claim 2, wherein said main gas path is created between a casing surround a high pressure rotor and a rim of at least one disk.

5. The thermal management system of claim 1, wherein said means for delivering a second stream of cooling air comprises means for minimizing pressure loss while maximizing said disk web cooling.

6. The thermal management system of claim 5, wherein said means for minimizing pressure loss comprises at least one anti-vortex tube.

7. The thermal management system of claim 6, wherein said at least one anti-vortex tube is connected to a wall of a disk.

8. The thermal management system of claim 5 wherein said at least one anti-vortex tube includes a first anti-vortex tube mounted to a wall of a first disk and a second anti-vortex tube mounted to a wall of a second disk.

9. The thermal management system of claim 8, wherein a first one of said first and second anti-vortex tubes is shorter than a second one of said first and second anti-vortex tubes.

10. The thermal management system of claim 1, further comprising means for isolating the at least one forward cavity from said at least one aft cavity.

11. The thermal management system of claim 10, wherein said isolating means comprises a seal.

12. The thermal management system of claim 1, further comprising means for exiting said cooling air from said at least one aft cavity.

13. The thermal management system of claim 12, wherein said exiting means comprises at least one hole in a rear hub foot.

14. The thermal management system of claim 1, further comprising means for cooling the first stream of cooling air.

15. The thermal management system of claim 14, wherein said cooling means comprises a heat exchanger.

16. The thermal management system of claim 1, further comprising a compressor rotor having a front hub and said front hub having at least one flow hole therein for delivering said first stream of cooling air to said at least one forward cavity.

17. The thermal management system of claim 16, further comprising a tie shaft and said first stream of cooling air flowing through at least one bore in at least one disk and exiting through at least one flow hole in an outer diameter of said tie shaft.

18. The thermal management system of claim 17, wherein said tie shaft is a hollow shaft which encases a second shaft and wherein intershaft cooling air flows between an inner diameter of said tie shaft and an outer diameter of said second shaft.

19. The thermal management system of claim 18, wherein said second shaft is a low pressure shaft.

\* \* \* \* \*